(12) United States Patent
Wagner

(10) Patent No.: US 11,874,372 B2
(45) Date of Patent: Jan. 16, 2024

(54) FISH FINDER TRANSDUCER MOUNT APPARATUS

(71) Applicant: Stephen E. Wagner, Saint Marys, OH (US)

(72) Inventor: Stephen E. Wagner, Saint Marys, OH (US)

( * ) Notice: Subject to any disclaimer, the term of this patent is extended or adjusted under 35 U.S.C. 154(b) by 849 days.

(21) Appl. No.: 16/933,588

(22) Filed: Jul. 20, 2020

(65) Prior Publication Data

US 2022/0018958 A1 Jan. 20, 2022

(51) Int. Cl.
| | |
|---|---|
| *G01S 15/96* | (2006.01) |
| *B63H 20/00* | (2006.01) |
| *G10K 11/00* | (2006.01) |
| *A01K 79/00* | (2006.01) |
| *A01K 97/00* | (2006.01) |

(52) U.S. Cl.
CPC .............. *G01S 15/96* (2013.01); *A01K 79/00* (2013.01); *A01K 97/00* (2013.01); *B63H 20/007* (2013.01); *G10K 11/004* (2013.01)

(58) Field of Classification Search
CPC ....... B63H 20/007; G01S 15/96; G01S 7/521; G10K 11/006; G10K 2200/11
See application file for complete search history.

(56) References Cited

U.S. PATENT DOCUMENTS

| | | | |
|---|---|---|---|
| 4,282,590 A * | 8/1981 | Wingate | G10K 11/355 367/173 |
| D304,947 S | 12/1989 | Reynolds | |
| 4,982,924 A * | 1/1991 | Havins | G10K 11/006 248/295.11 |
| 5,171,173 A | 12/1992 | Henderson | |
| 5,573,221 A * | 11/1996 | Reeves | B63H 20/007 367/173 |
| 7,455,558 B2 | 11/2008 | Yander | |
| 7,722,417 B2 | 5/2010 | Bernloehr | |
| 9,322,915 B2 * | 4/2016 | Betts | G01S 15/8902 |
| 9,505,474 B1 * | 11/2016 | Marodis | G01S 15/96 |
| 9,676,462 B2 | 6/2017 | Bernloehr | |
| 10,281,576 B2 | 5/2019 | DePasqua | |
| 10,377,459 B2 | 8/2019 | Burton | |
| 11,217,216 B2 * | 1/2022 | Vance | G10K 11/004 |
| 11,279,457 B1 * | 3/2022 | Craft | B63H 20/06 |
| 11,370,516 B2 * | 6/2022 | Ridl | B63H 20/12 |
| 2016/0274227 A1 * | 9/2016 | Wilhelm | G01S 7/521 |
| 2021/0278514 A1 * | 9/2021 | Hughes | G01S 7/521 |
| 2022/0106025 A1 * | 4/2022 | Roller | B63B 3/40 |
| 2022/0390542 A1 * | 12/2022 | Clark | G09B 29/003 |

* cited by examiner

*Primary Examiner* — Bradley Duckworth
(74) *Attorney, Agent, or Firm* — Warmstadt

(57) ABSTRACT

A fish finder transducer mount apparatus for independently controlling a directional transducer and trolling motor includes a clamp body. A motor clamp is coupled to the clamp body. The motor clamp is selectively engageable with the clamp body and configured to secure the apparatus to a propeller shaft of a trolling motor. A directional transducer shaft is rotatably coupled to the clamp body and a directional transducer shaft bottom end of the directional transducer shaft to receive a directional transducer of a fish finder. A gearing system is coupled to the directional transducer shaft to rotate the directional transducer shaft. A handle is coupled to the gearing system. The handle comprises an extension portion secured by a user to manipulate the orientation of the directional transducer shaft.

11 Claims, 5 Drawing Sheets

FISH FINDER TRANSDUCER MOUNT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to transducer mounting devices and more particularly pertains to a new transducer mounting device for independently controlling a directional transducer and trolling motor.

(2) Description of Related Art Including Information Disclosed Under 37 CFR 1.97 and 1.98

The prior art relates to transducer mounting devices and trolling motors. Existing devices allow for directional manipulation and indication of trolling motors, and for directional transducers to mount directly with the trolling motors. Existing devices lack an ability to independently manipulate a trolling motor and a directional transducer. Existing devices also fail to indicate the current direction of a directional transducer unless it is linked to the direction of the trolling motor.

BRIEF SUMMARY OF THE INVENTION

An embodiment of the disclosure meets the needs presented above by generally comprising a clamp body having a body front side, a body back side, a body a left side, a body right side, a body top side, and a body bottom side. A motor clamp is coupled to the clamp body. The motor clamp is selectively engageable with the clamp body and configured to secure the apparatus to a propeller shaft of a trolling motor. A directional transducer shaft is rotatably coupled to the clamp body and a directional transducer shaft bottom end of the directional transducer shaft is configured to receive a directional transducer of a fish finder. A gearing system is coupled to the directional transducer shaft to rotate the directional transducer shaft. A handle is coupled to the gearing system. The handle comprises an extension portion secured by a user to manipulate the orientation of the directional transducer shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
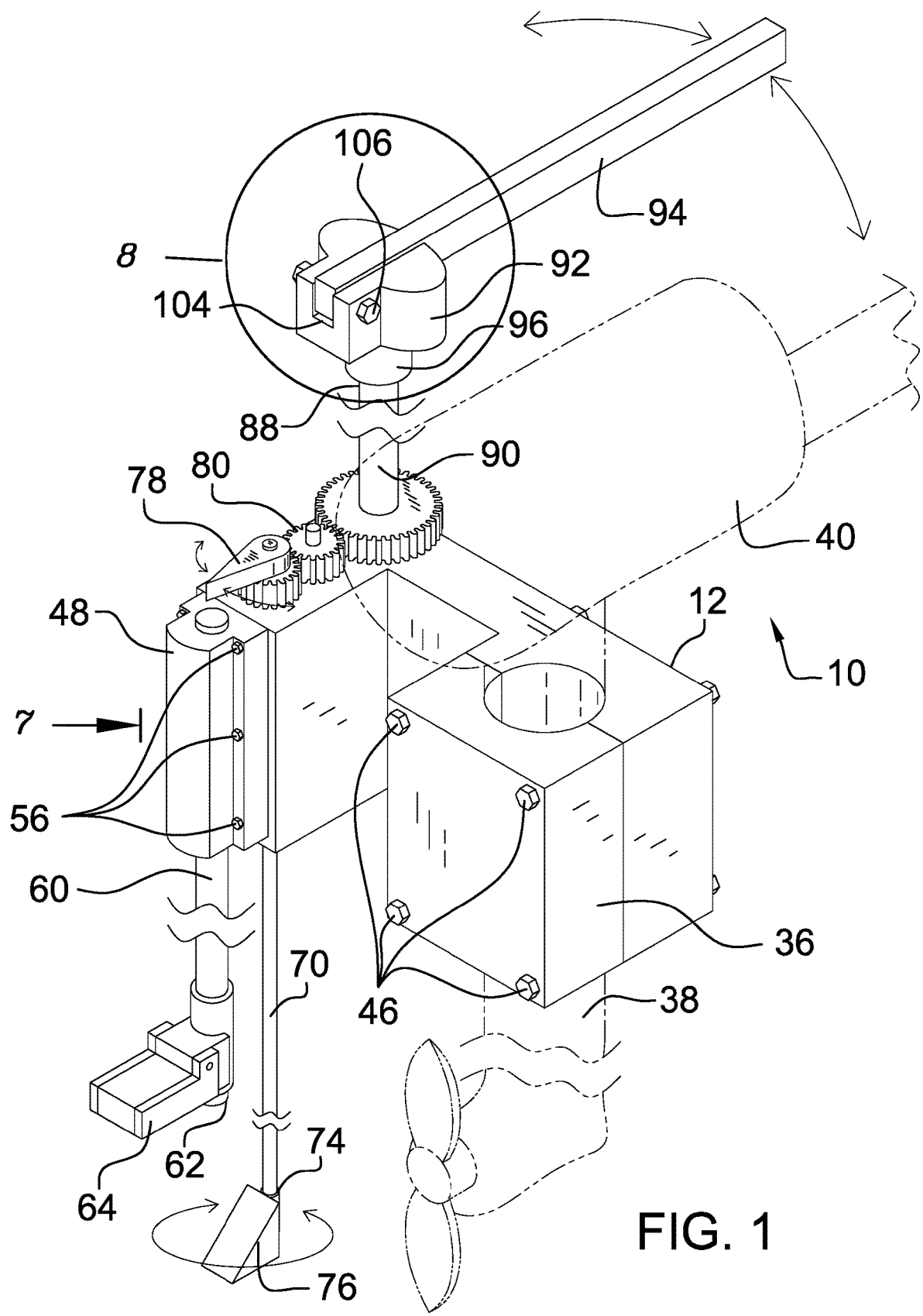
FIG. 1 is an isometric view of a fish finder transducer mount apparatus according to an embodiment of the disclosure.
Figure 2:
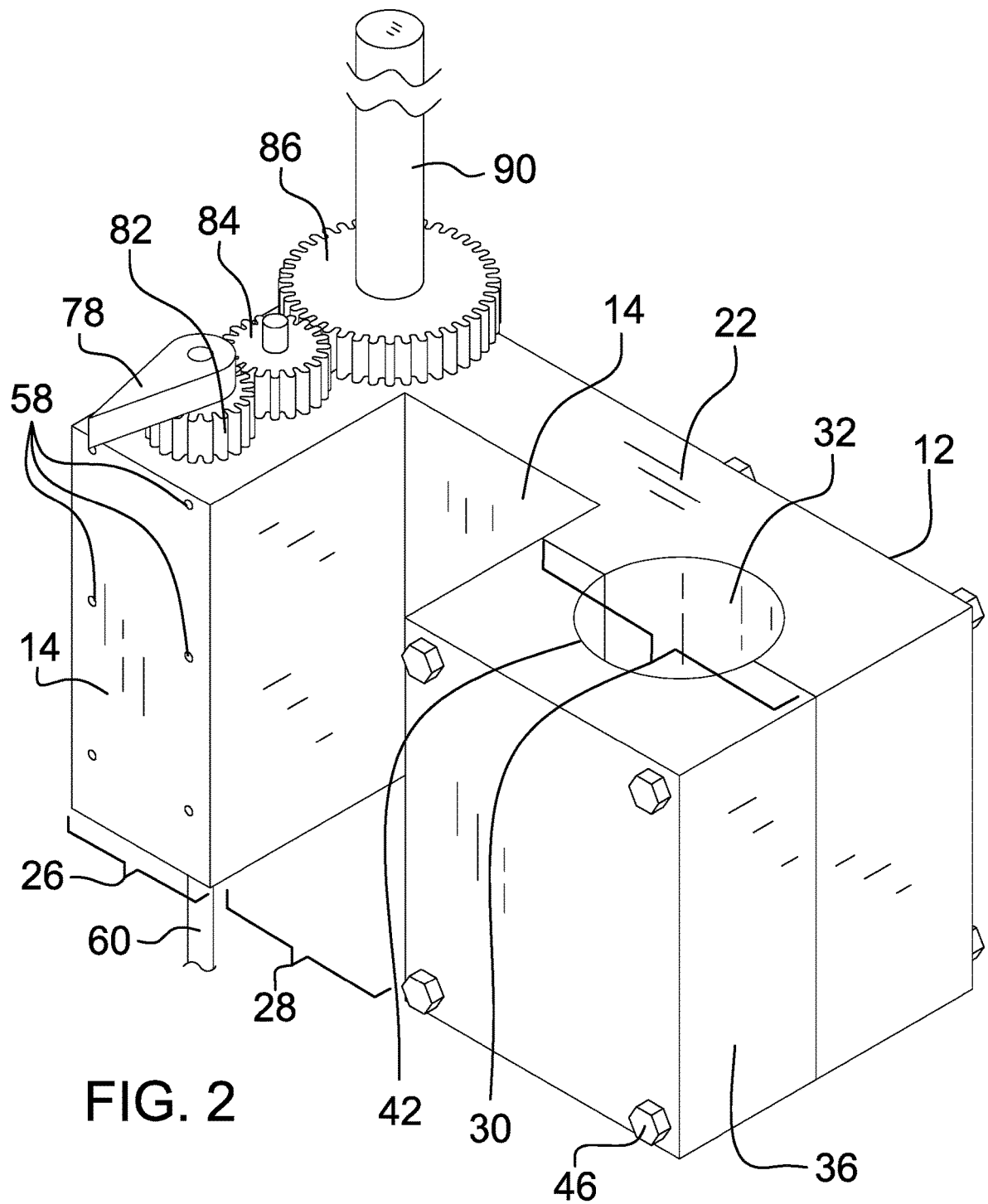
FIG. 2 is an isometric view of an embodiment of the disclosure.
Figure 3:
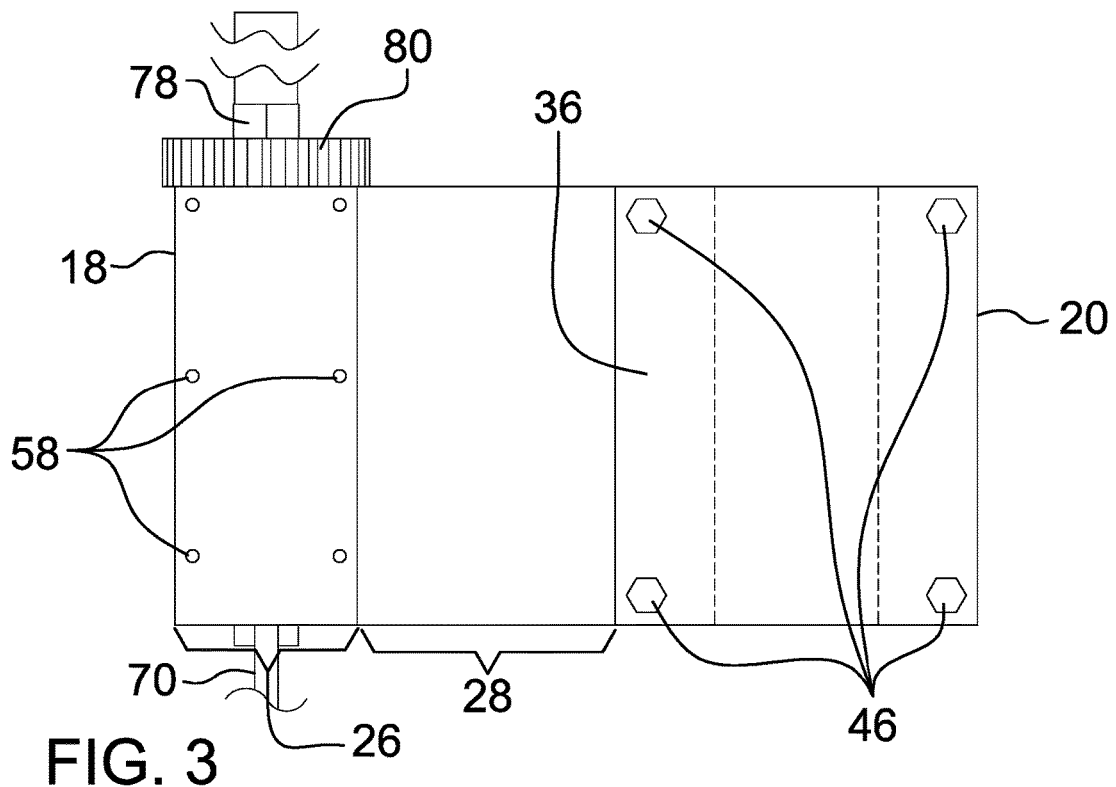
FIG. 3 is a front elevation view of an embodiment of the disclosure.
Figures 4, 5:
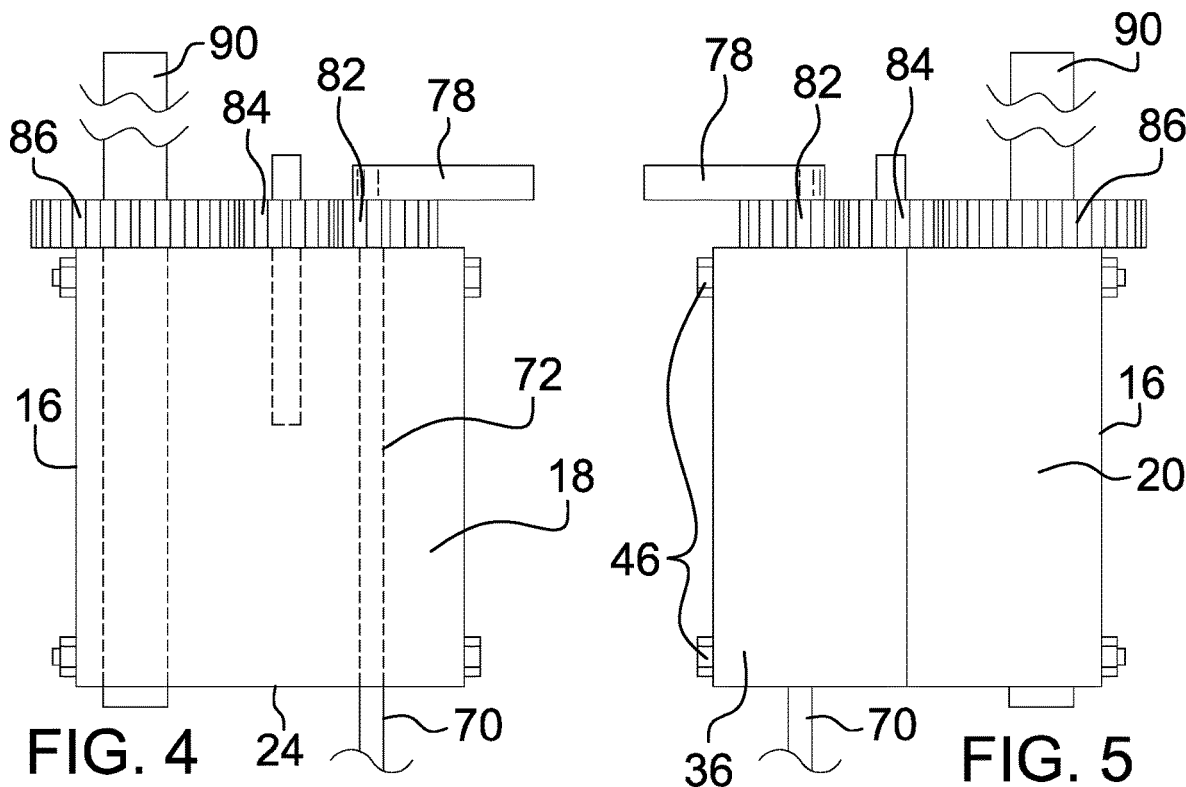
FIG. 4 is a left side elevation view of an embodiment of the disclosure.
FIG. 5 is a right side elevation view of an embodiment of the disclosure.
Figure 6:
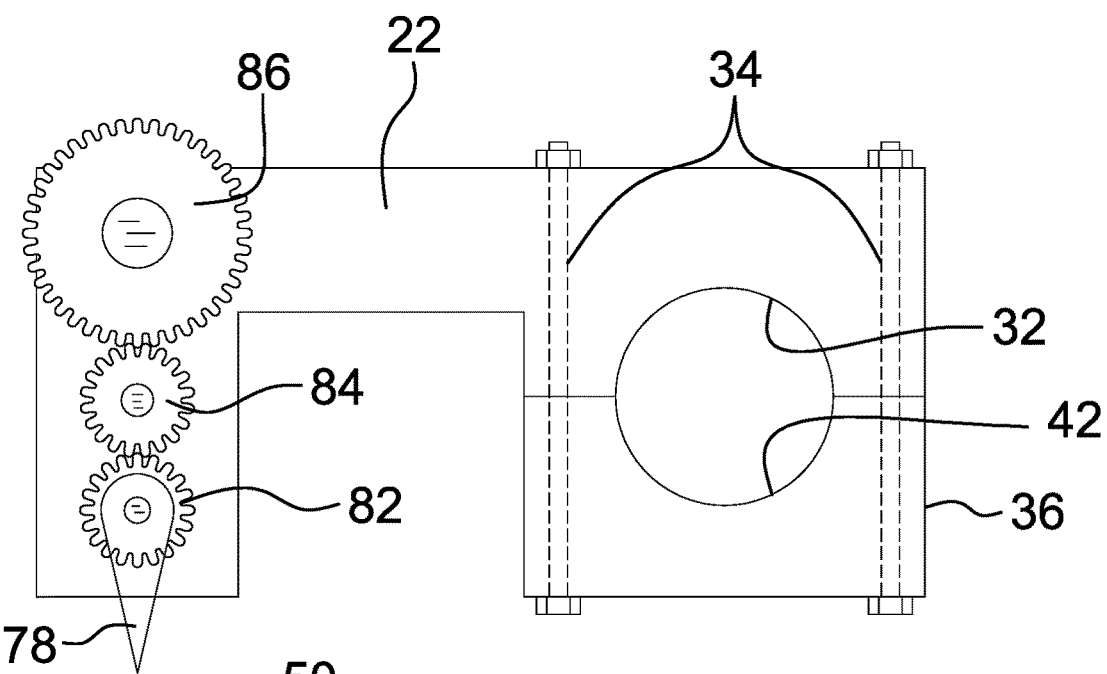
FIG. 6 is a top plan view of an embodiment of the disclosure.
Figure 7:
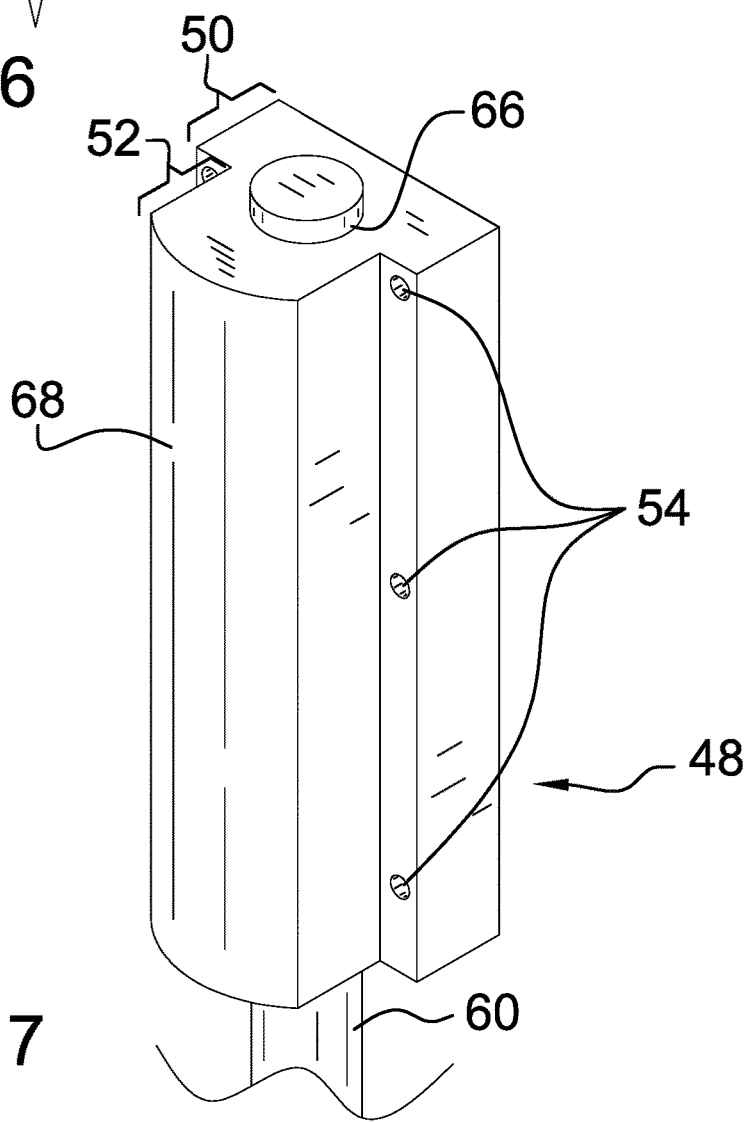
FIG. 7 is a detail isometric view of an embodiment of the disclosure.
Figure 8:
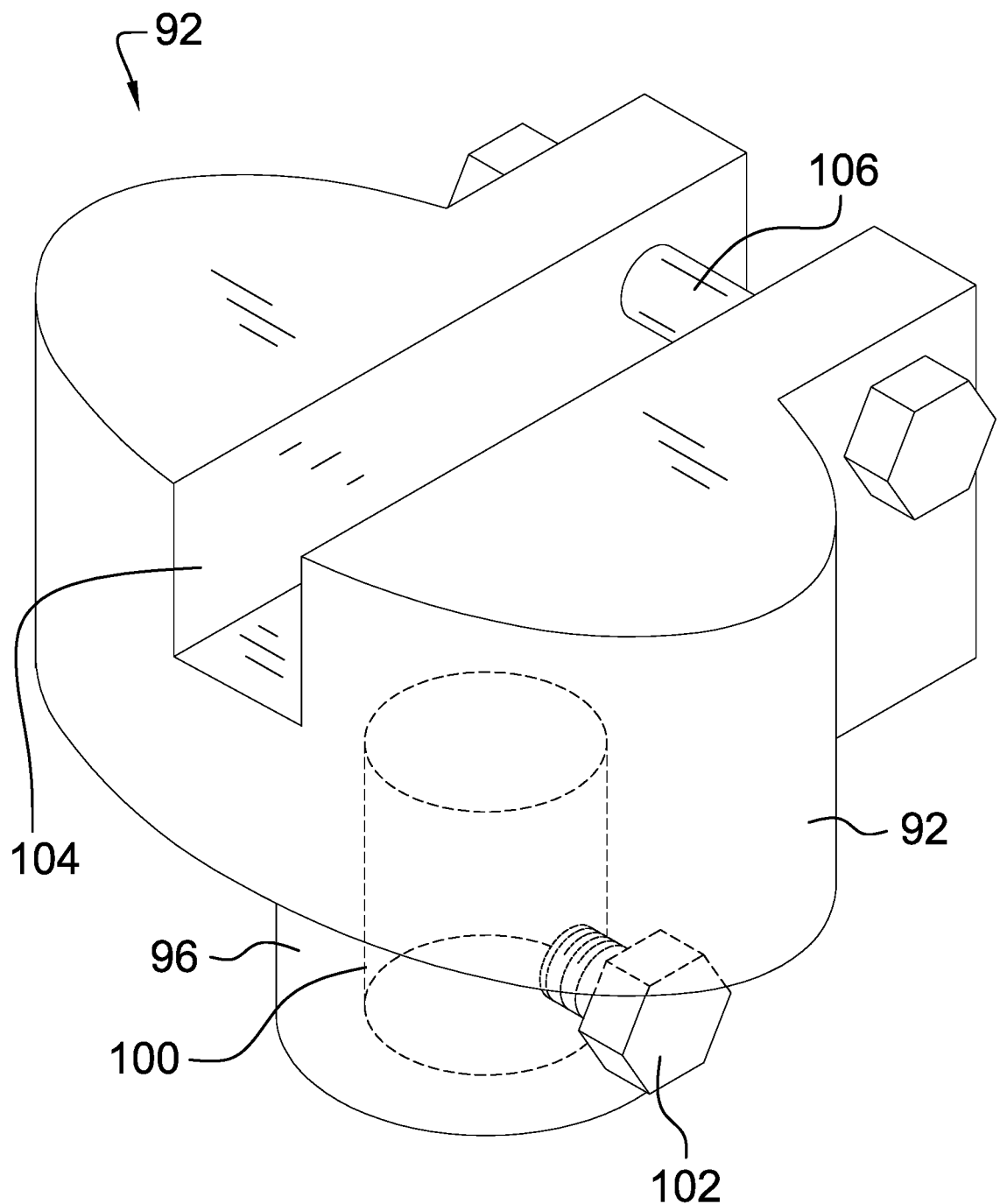
FIG. 8 is a detail isometric view of an embodiment of the disclosure.

With reference now to the drawings, and in particular to FIGS. 1 through 8 thereof, a new transducer mounting device embodying the principles and concepts of an embodiment of the disclosure and generally designated by the reference numeral 10 will be described.

As best illustrated in FIGS. 1 through 8, the fish finder transducer mount apparatus 10 generally comprises a clamp body 12 having a body front side 14, a body back side 16, a body a left side 18, a body right side 20, a body top side 22, and a body bottom side 24. The body front side 14 may have a left portion 26, a recessed medial portion 28 and a right portion 30. The right portion 30 may have a vertical hemicylindrical first shaft depression 32 and a plurality of clamp receiving apertures 34 on each side of the first shaft depression 32. The plurality of clamp receiving apertures 34 may comprise two clamp receiving apertures 34 on each side of the first shaft depression 32. Each clamp receiving aperture 34 may extend from the right portion 30 of the body front side through the body back side 16.

A motor clamp 36 is coupled to the clamp body 12. The motor clamp 36 is selectively engageable with the clamp body 12 and configured to secure the apparatus 10 to a propeller shaft 38 of a trolling motor 40. The motor clamp 36 may have a vertical hemicylindrical second shaft depression 42 corresponding with the first shaft depression 32 and a plurality of clamp mounting apertures 44 corresponding with the plurality of clamp receiving apertures 34 to receive a plurality of clamp bolts 46.

A non-directional transducer bracket 48 may be coupled to the clamp body 12. The non-directional transducer bracket 48 is selectively engageable with clamp body 12. The non-directional transducer bracket 48 may have a rectangular prismatic mounting portion 50 and a vertically-oriented shaft portion 52 extending from the mounting portion 50. The mounting portion 50 has a plurality of bracket through apertures 54 extending therethrough to receive a plurality of bracket bolts 56 and engage with a corresponding plurality of bracket threaded apertures 58 extending into the left portion 26 of the body front side. There may be six bracket through apertures 54 and six bracket threaded apertures 58.

A non-directional transducer shaft 60 is coupled to the non-directional transducer bracket 48. A non-directional transducer shaft bottom end 62 of the non-directional transducer shaft is configured to receive a non-directional transducer 64 of a fish finder. The non-directional transducer shaft 60 is coupled within a non-directional transducer shaft aperture 66 extending through the shaft portion 52 of the non-directional transducer bracket. An outer face 68 of the shaft portion 52 may be rounded.

A directional transducer shaft 70 is coupled to the clamp body 12. The directional transducer shaft 70 is rotatably coupled through a directional transducer shaft aperture 72 of the clamp body extending from the body top side 22 through the body bottom side 24. A directional transducer shaft bottom end 74 of the directional transducer shaft is configured to receive a directional transducer 76 of the fish finder.

A directional indicator 78 may be coupled to a directional transducer shaft top end 80 of the directional transducer shaft. The directional indicator 78 may be teardrop shaped, arrow-shaped, or otherwise asymmetrical to indicate directionality. The directional indicator 78 is oriented in the same direction as the attached directional transducer 76 of the fish finder. The directional indicator 78 serves as a visible targeting mechanism above the clamp body 12 since the directional transducer 76 is submerged in the water.

A gearing system 80 may be coupled to the directional transducer shaft 70. The gearing system 80 may comprise a transducer gear 82 coupled to the directional transducer shaft 70 beneath the directional indicator 78 and driving the directional transducer shaft 70. A medial gear 84 is in operational communication with the transducer gear 82 and a handle gear 86 is in operational communication with the medial gear 84. The transducer gear 82 and the medial gear 84 may have an equal number of teeth with the medial gear 84 serving to make the transducer gear 82 and the handle gear 86 spin in the same direction. The handle gear 86 may have three times as many teeth as each of the transducer gear 82 and the medial gear 84. The handle gear 86 may thus be a 120° sector shape.

A handle 88 is coupled to the gearing system 80. The handle 88 comprises a main shaft 90 coupled to the handle gear 86, a main shaft head 92 coupled to the main shaft 90, and an extension portion 94 pivotably coupled to the main shaft head 92. The main shaft head 92 may have a collar portion 96 and a head portion 98. The collar portion 96 has a shaft receiver aperture 100 extending therethrough and a set screw 102 to receive and secure the main shaft 90. The head portion 98 may have a handle slot 104 and a handle pin 106 extending through the handle slot 104. The extension portion 94 is pivotably coupled to the handle pin 106 and has a 270° range of motion to move between a use position within the handle slot 104 and perpendicular with the main shaft 90 and a store position parallel with the main shaft 90. The extension portion 94 is secured by a user to manipulate the orientation of the directional transducer shaft 70 and thus the directional transducer 76.

In use, the motor clamp 36 is attached to the clamp body 12 to secure the apparatus 10 to the propeller shaft 38. The non-directional transducer shaft 60 is coupled to the non-directional transducer bracket 48. The handle 88 is then used with the extension portion 94 to manipulate the directional transducer 76 in the desired direction while being able to separately direct the trolling motor 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fish finder transducer mount apparatus comprising:
   a clamp body having a body front side, a body back side, a body a left side, a body right side, a body top side, and a body bottom side;
   a motor clamp coupled to the clamp body, the motor clamp being selectively engageable with the clamp body and configured to secure the apparatus to a propeller shaft of a trolling motor;
   a directional transducer shaft coupled to the clamp body, the directional transducer shaft being rotatably coupled to the clamp body, a directional transducer shaft bottom end of the directional transducer shaft being configured to receive a directional transducer of a fish finder;
   a gearing system coupled to the directional transducer shaft, the gearing system rotating the directional transducer shaft; and
   a handle coupled to the gearing system, the handle comprising an extension portion being secured by a user to manipulate the orientation of the directional transducer shaft; and
   a non-directional transducer bracket coupled to the clamp body, the non-directional transducer bracket being selectively engageable with clamp body; and a non-directional transducer shaft coupled to the non-directional transducer bracket, a non-directional transducer shaft bottom end of the non-directional transducer shaft being configured to receive a non-directional transducer of the fish finder.

2. The fish finder transducer mount apparatus of claim 1 further comprising the non-directional transducer bracket having a rectangular prismatic mounting portion and a shaft portion extending from the mounting portion, the mounting portion having a plurality of bracket through apertures extending therethrough to receive a plurality of bracket bolts and engage with a corresponding plurality of bracket threaded apertures extending into the body front side.

3. The fish finder transducer mount apparatus of claim 1 further comprising the body front side having a left portion, a recessed medial portion and a right portion, the right portion having a vertical hemicylindrical first shaft depression and a plurality of clamp receiving apertures on each side of the first shaft depression, the motor clamp having a vertical hemicylindrical second shaft depression corresponding with the first shaft depression and a plurality of clamp mounting apertures corresponding with the plurality of clamp receiving apertures to receive a plurality of clamp bolts.

4. The fish finder transducer mount apparatus of claim 1 further comprising the directional transducer shaft being rotatably coupled through a directional transducer shaft aperture of the clamp body extending from the body top side through the body bottom side.

5. The fish finder transducer mount apparatus of claim 4 further comprising a directional indicator coupled to a directional transducer shaft top end of the directional transducer shaft, the directional indicator being oriented in the same direction as the attached directional transducer of the fish finder.

6. The fish finder transducer mount apparatus of claim 1 further comprising the gearing system comprising a transducer gear coupled to the directional transducer shaft, a medial gear in operational communication with the transducer gear, and a handle gear in operational communication with the medial gear.

7. The fish finder transducer mount apparatus of claim 1 further comprising the handle comprising a main shaft coupled to the gearing system, a main shaft head coupled to the main shaft, and the extension portion being pivotably coupled to the main shaft head.

8. The fish finder transducer mount apparatus of claim 7 further comprising the extension portion having a 270° range of motion to move between a use position perpendicular with the main shaft and a store position parallel with the main shaft.

9. The fish finder transducer mount apparatus of claim 1, further comprising:
the body front side having a left portion, a recessed medial portion and a right portion, the right portion having a vertical hemicylindrical first shaft depression and a plurality of clamp receiving apertures on each side of the first shaft depression;
the motor clamp having a vertical hemicylindrical second shaft depression corresponding with the first shaft depression and a plurality of clamp mounting apertures corresponding with the plurality of clamp receiving apertures to receive a plurality of clamp bolts;
the non-directional transducer bracket having a rectangular prismatic mounting portion and a shaft portion extending from the mounting portion, the mounting portion having a plurality of bracket through apertures extending therethrough to receive a plurality of bracket bolts and engage with a corresponding plurality of bracket threaded apertures extending into the body front side;
the non-directional transducer shaft being coupled within a non-directional transducer shaft aperture extending through the shaft portion of the non-directional transducer bracket;
a directional indicator coupled to a directional transducer shaft top end of the directional transducer shaft, the directional indicator being oriented in the same direction as the attached directional transducer of the fish finder;
the gearing system comprising a transducer gear coupled to the directional transducer shaft and rotating the directional transducer shaft, a medial gear in operational communication with the transducer gear, and a handle gear in operational communication with the medial gear; and
the handle comprising a main shaft coupled to the gearing system, a main shaft head coupled to the main shaft, and the extension portion being pivotably coupled to the main shaft head, the main shaft head having a collar portion and a head portion, the collar portion having a shaft receiver aperture extending therethrough and a set screw to receive and secure the main shaft, the head portion having a handle slot and a handle pin extending through the handle slot, the extension portion being pivotably coupled to the handle pin and having a 270° range of motion to move between a use position perpendicular with the main shaft and a store position parallel with the main shaft, the extension portion being secured by a user to manipulate the orientation of the directional transducer shaft.

10. A fish finder transducer mount apparatus comprising:
a clamp body having a body front side, a body back side, a body a left side, a body right side, a body top side, and a body bottom side;
a motor clamp coupled to the clamp body, the motor clamp being selectively engageable with the clamp body and configured to secure the apparatus to a propeller shaft of a trolling motor;
a directional transducer shaft coupled to the clamp body, the directional transducer shaft being rotatably coupled to the clamp body, a directional transducer shaft bottom end of the directional transducer shaft being configured to receive a directional transducer of a fish finder;
a gearing system coupled to the directional transducer shaft, the gearing system rotating the directional transducer shaft; and
a handle coupled to the gearing system, the handle comprising an extension portion being secured by a user to manipulate the orientation of the directional transducer shaft, the handle comprising a main shaft coupled to the gearing system, a main shaft head coupled to the main shaft, and the extension portion being pivotably coupled to the main shaft head, the main shaft head having a collar portion and a head portion, the collar portion having a shaft receiver aperture extending therethrough and a set screw to receive and secure the main shaft, the head portion having a handle slot and a handle pin extending through the handle slot, the extension portion being coupled to the handle pin.

11. A fish finder and fish finder transducer mount apparatus combination comprising:
a fish finder, the fish finder comprising a non-directional transducer and a directional transducer;

a clamp body having a body front side, a body back side, a body a left side, a body right side, a body top side, and a body bottom side, the body front side having a left portion, a recessed medial portion and a right portion, the right portion having a vertical hemicylindrical first shaft depression and a plurality of clamp receiving apertures on each side of the first shaft depression;

a motor clamp coupled to the clamp body, the motor clamp being selectively engageable with the clamp body to secure the apparatus to a propeller shaft of a trolling motor, the motor clamp having a vertical hemicylindrical second shaft depression corresponding with the first shaft depression and a plurality of clamp mounting apertures corresponding with the plurality of clamp receiving apertures to receive a plurality of clamp bolts;

a non-directional transducer bracket coupled to the clamp body, the non-directional transducer bracket being selectively engageable with clamp body, the non-directional transducer bracket having a rectangular prismatic mounting portion and a shaft portion extending from the mounting portion, the mounting portion having a plurality of bracket through apertures extending therethrough to receive a plurality of bracket bolts and engage with a corresponding plurality of bracket threaded apertures extending into the body front side;

a non-directional transducer shaft coupled to the non-directional transducer bracket, a non-directional transducer shaft bottom end of the non-directional transducer shaft receiving the non-directional transducer of the fish finder, the non-directional transducer shaft being coupled within a non-directional transducer shaft aperture extending through the shaft portion of the non-directional transducer bracket;

a directional transducer shaft coupled to the clamp body, the directional transducer shaft being rotatably coupled through a directional transducer shaft aperture of the clamp body extending from the body top side through the body bottom side, a directional transducer shaft bottom end of the directional transducer shaft receiving the directional transducer of the fish finder;

a directional indicator coupled to a directional transducer shaft top end of the directional transducer shaft, the directional indicator being oriented in the same direction as the attached directional transducer of the fish finder;

a gearing system coupled to the directional transducer shaft, the gearing system comprising a transducer gear coupled to the directional transducer shaft and rotating the directional transducer shaft, a medial gear in operational communication with the transducer gear, and a handle gear in operational communication with the medial gear, and a handle coupled to the gearing system, the handle comprising a main shaft coupled to the gearing system, a main shaft head coupled to the main shaft, and an extension portion being pivotably coupled to the main shaft head, the main shaft head having a collar portion and a head portion, the collar portion having a shaft receiver aperture extending therethrough and a set screw to receive and secure the main shaft, the head portion having a handle slot and a handle pin extending through the handle slot, the extension portion being pivotably coupled to the handle pin and having a 270° range of motion to move between a use position perpendicular with the main shaft and a store position parallel with the main shaft, the extension portion being secured by a user to manipulate the orientation of the directional transducer shaft.

* * * * *